United States Patent
Kohara (10) Patent No.: US 8,757,995 B2
(45) Date of Patent: Jun. 24, 2014

(54) TIRE VULCANIZATION MOLD

(71) Applicant: Sumitomo Rubber Industries, Ltd., Kobe (JP)

(72) Inventor: Kei Kohara, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 13/888,871

(22) Filed: May 7, 2013

(65) Prior Publication Data

US 2013/0323342 A1    Dec. 5, 2013

(30) Foreign Application Priority Data

May 29, 2012    (JP) ................. 2012-122252

(51) Int. Cl.
B29C 33/10    (2006.01)
(52) U.S. Cl.
USPC ............................ 425/28.1; 425/812
(58) Field of Classification Search
USPC .................................. 425/28.1, 812
See application file for complete search history.

(56) References Cited

U.S. PATENT DOCUMENTS

| | | | | |
|---|---|---|---|---|
| 2,665,967 A | * | 1/1954 | Bean et al. | 425/812 |
| 4,021,168 A | * | 5/1977 | Dailey | 425/812 |
| 4,436,497 A | * | 3/1984 | Dahl et al. | 425/812 |
| 4,447,197 A | | 5/1984 | Bartley et al. | |
| 4,895,502 A | * | 1/1990 | Beard et al. | 425/812 |
| 5,059,380 A | | 10/1991 | Wise et al. | |
| 5,800,642 A | * | 9/1998 | Ohya | 425/812 |
| 6,789,591 B2 | * | 9/2004 | Ikeda | 425/812 |
| 7,118,702 B2 | * | 10/2006 | Marchadier et al. | 425/812 |
| 7,290,996 B2 | * | 11/2007 | Tanaka | 425/812 |
| 2001/0002604 A1 | | 6/2001 | Ikeda | |
| 2003/0218276 A1 | | 11/2003 | Marchadier et al. | |

FOREIGN PATENT DOCUMENTS

| | | | |
|---|---|---|---|
| EP | 1361042 A2 | | 11/2003 |
| JP | 5-138656 | * | 6/1993 |
| JP | 2001-163018 A | | 6/2001 |
| WO | WO 88/01927 A1 | | 3/1988 |
| WO | WO 2006/129642 A1 | | 12/2006 |

OTHER PUBLICATIONS

Extended European Search Report for European Application No. 13166741.2, dated Aug. 6, 2013.

* cited by examiner

*Primary Examiner* — James Mackey
(74) *Attorney, Agent, or Firm* — Birch, Stewart, Kolasch & Birch, LLP (57) ABSTRACT

A tire vulcanization mold comprises a mold body having an inner surface for molding a tire outer surface and at least one vent passage for the escape of gas in the mold during vulcanization, the vent passage with an inlet end and an outlet end, the inlet end being opened on the inner surface of the mold body, the outlet end communicating with an exterior of the mold body, wherein the vent passage communicates with the inner surface of the mold body at an angle of not less than 60 degrees, and less than 90 degrees with respect to a normal line perpendicular to the inner surface at the inlet end.

6 Claims, 8 Drawing Sheets

PRIOR ART

TIRE VULCANIZATION MOLD

BACKGROUND OF THE INVENTION

1. Field of the Invention

The present invention relates to a tire vulcanization mold for manufacturing a tire, more particularly to a structure of an improved air vent passage to reduce spew formation on an outer surface of a tire while permitting the escape of gas from the mold.

2. Description of the Related Art

Typically, a tire is produced through a vulcanizing process that molds and vulcanizes a green tire using a tire vulcanization mold with an inner surface for molding a tire. In the vulcanizing process, the green tire is heated and pressed onto the inner surface of the mold. In order to precisely mold a vulcanized tire, the green tire should be fitted closely and uniformly on the inner surface of the mold during the vulcanizing process.

However, in the event that whole portions of the green tire do not contact with the inner surface of the mold simultaneously, air would be trapped therebetween and remain. Such air may not only prevent smooth rubber flow during vulcanization process, but also causes molding defects such as a dent on the outer surface of the tire.

Figure 9:
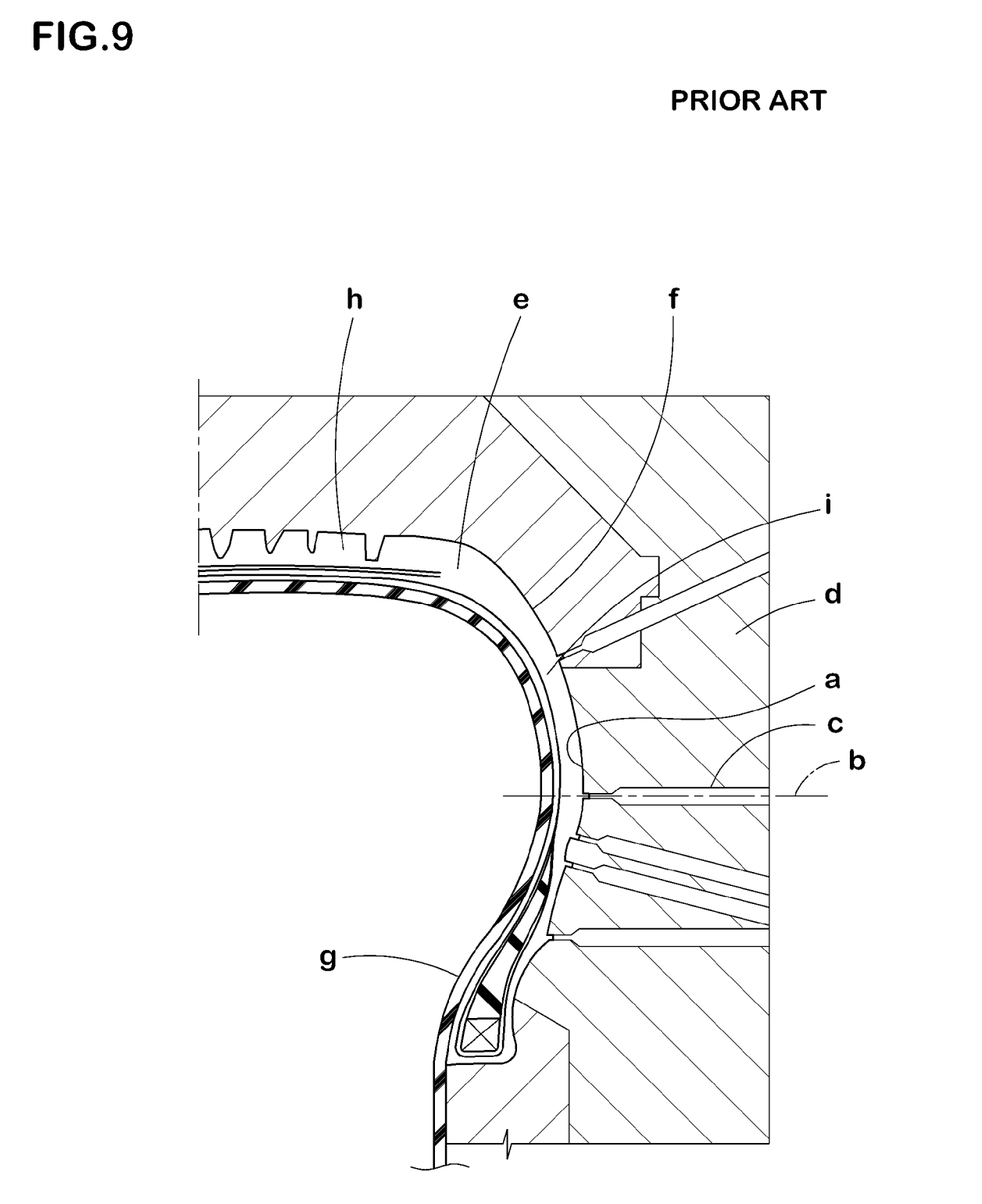
FIG. 9 is a cross sectional view of a conventional tire vulcanization mold.

As shown in FIG. 9, in order to prevent molding defects of a tire, a tire vulcanization mold (d) having air vent passages (c) extending from an inner surface (a) to an exterior of the mold for the escape of gas is proposed. The tire vulcanization mold is provided with a bladder (g) which is inflated in a cavity of the green tire placed in the mold so as to press the green tire in the normal direction (b) to the inner surface (d) of the mold. The vent passages (c) also extend in substantially parallel with the normal direction (b) to the inner surface (d) of the mold.

Thus, air as well as a part of plasticized rubber (i) pressed by the bladder (g) goes into the vent passage (c) easily during vulcanizing process. After vulcanizing process, rubber insertion in the vent passage (c) turns to a spew remained on the outer surface of the tire. The tire having spews is liable to decrease in quality and appearance thereof. In order to prevent spew formation on outer surface of tires, the vent passage having a small inside diameter in which rubber is difficult to enter is proposed. However, such a vent passage may not work for the escape of gas sufficiently.

SUMMARY OF THE INVENTION

The present invention has been made in light of such circumferences. A main object of the present invention is to provide a tire vulcanization mold to reduce spew formation on an outer surface of a tire while permitting the escape of gas from the mold.

According to one aspect of the present invention, there is provided a tire vulcanization mold comprising a mold body having an inner surface for molding a tire outer surface and at least one vent passage for the escape of gas in the mold during vulcanization, the vent passage having an inlet end and an outlet end, the inlet end being opened on the inner surface of the mold body, the outlet end communicating with an exterior of the mold body, wherein the vent passage communicates with the inner surface of the mold body at an angle of not less than 60 degrees, and less than 90 degrees with respect to a normal line perpendicular to the inner surface at the inlet end.

Preferably, the vent passage inclines to a circumferential direction of the tire.

Preferably, the inner surface includes a sidewall inner surface for molding a sidewall of the tire, and the inlet end of the vent passage is opened on the sidewall inner surface.

Preferably, the vent passage comprises a first portion and a second portion, the first portion extends from the inlet end, the second portion extends from the first portion toward the exterior of the mold, and the first portion is a through hole of a vent pipe which is detachably inserted in the hole provided on the inner surface of the mold body.

Preferably, the through hole of the vent pipe has a cross sectional area in a range of from 0.10 to 0.30 mm².

Preferably, the inlet end of the vent passage has a circumferentially long oblong shape.

Preferably, the oblong shape is a rectangular shape or an elliptic shape.

By using the present invention, there is preferably provided a method for manufacturing a tire which comprises the steps of preparing an unvulcanized green tire, and vulcanizing the green tire using a tire vulcanization mold, wherein the tire vulcanization mold comprises a mold body having an inner surface for molding a tire outer surface and at least one vent passage for the escape of gas in the mold during vulcanization, the vent passage having an inlet end and an outlet end, the inlet end being opened on the inner surface of the mold body, the outlet end communicating with an exterior of the mold body, wherein the vent passage communicates with the inner surface of the mold body at an angle of not less than 60 degrees, and less than 90 degrees with respect to a normal line perpendicular to the inner surface at the inlet end.

DESCRIPTION OF THE PREFERRED EMBODIMENTS

One embodiment of the present invention will be described below with reference to the drawings.

Figure 1:
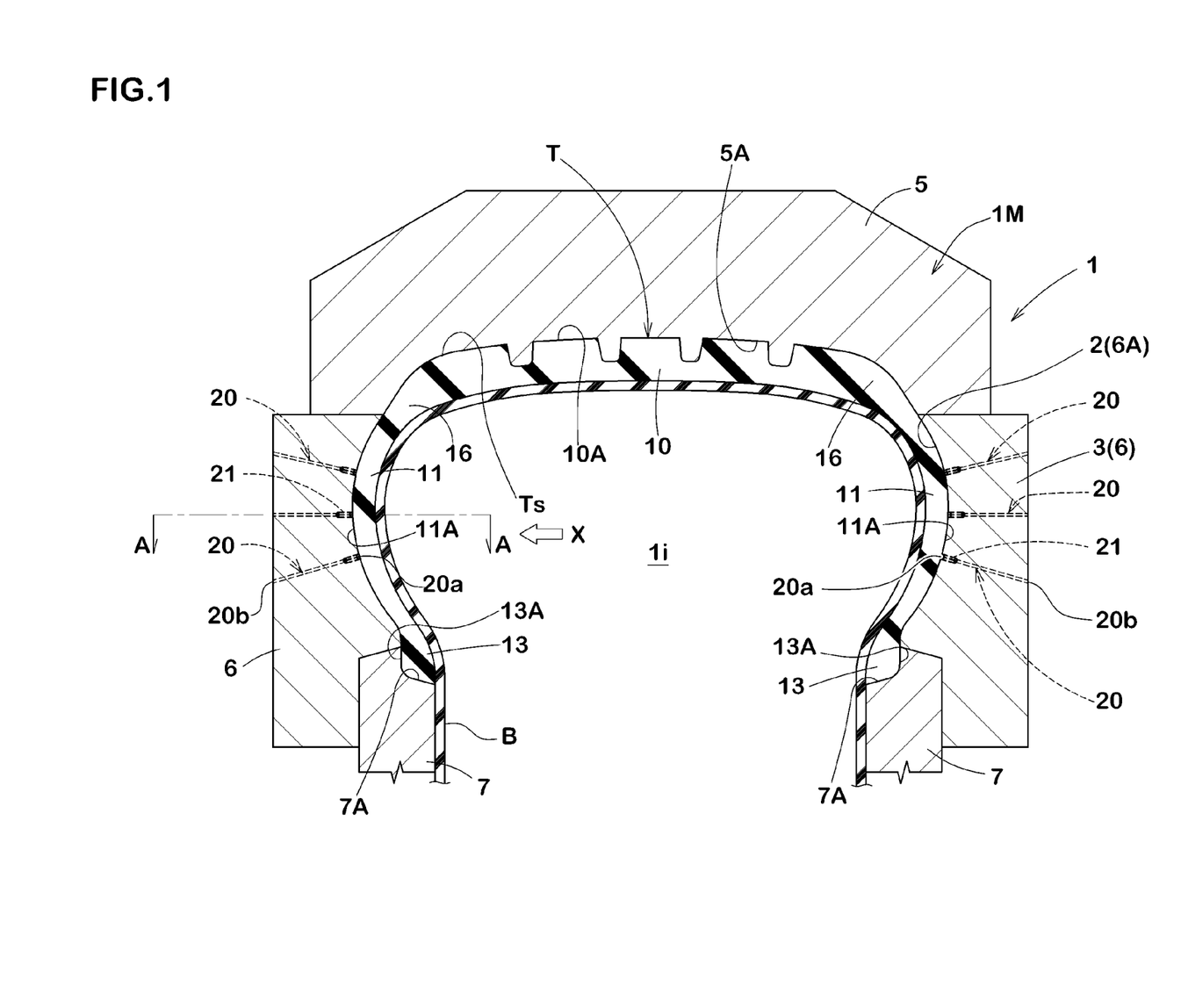
FIG. 1 is a cross sectional view of a tire vulcanization mold showing an embodiment of the present invention.

Referring to FIG. 1, a tire vulcanization mold 1 of the present embodiment (hereinafter, also referred to simply as "the mold") comprises a mold body 1M having an internal cavity 1i surrounded by an inner surface 2 for molding a tire outer surface Ts. A green tire T which means an unvulcanized tire is placed in the internal cavity 1i of the mold body 1M and is subjected to heat and press toward the inner surface 2 of the mold body 1M by an inflated bladder B. Through such a vulcanizing process, the green tire T is molded as a vulcanized tire having an intended tire profile.

The green tire T comprises a tread portion 10, a pair of sidewall portions 11 each extending from both ends of the tread portion 2 radially inwardly of the tire, a pair of bead portions 13 each provided with each radially inner end of the sidewall portion 11. The green tire is illustrated as for a passenger car tire, in this embodiment. The green tire T may have a typically internal structure of a radial tire that includes troidal carcass extending between the bead portions 13, 13 through the tread and sidewall portions 10, 13, and a belt disposed radially outside the carcass in the tread portion 10 (not shown).

The mold body 1M in accordance with the present embodiment comprises: a tread mold 5 having a tread inner surface 10A for molding an outer surface 10A of the tread portion 10; a sidewall mold 6 having a sidewall inner surface 6A for molding an outer surface 11A of the sidewall portion 11; and a bead mold 7 having a bead inner surface 7A for molding an outer surface 13A of the bead portions 13.

The tread mold 5 comprises a plurality of segments which are arranged so as to annularly continue in the tire circumferential direction to obtain the tread inner surface 10A for molding a tread pattern onto the tread portion 10. Each segment of the tread mold 5 is arranged movably in the radial direction of the tire.

The sidewall mold 6 and the bead mold 7 continuously extend in the circumferential direction of the tire and are disposed movably in the axial direction. Thus, these molds 5, 6 and 7 are moved radially or axially outwardly of the tire so that the vulcanized tire is able to take out from the mold 1. Moreover, a heating device for heating each mold 5, 6 and 7 in a range of not less than 100 degrees Celsius is provided (not shown).

In this embodiment, a sidewall mold 6 has a vent passage 20 extending from the sidewall inner surface 6A to the exterior of the mold body 1M for the escape of gas in the mold 1 during vulcanization. The vent passage 20 has an inlet end 20a being opened on the sidewall inner surface 6A and an outlet end 20b communicating to an exterior of the mold body 1M. Preferably, the outlet end 20b of the vent passage 20 is connected to a pump (not shown) for creating a vacuum in the vent passage 20. Such a vent passage 20 can escape the gas between the sidewall portion 11 of the green tire and the sidewall inner surface 6A to the exterior of the mold body 1M so that the green tire fits closely on the inner surface 2 of the mold body 1M during the vulcanizing process for preventing molding defects.

An inside diameter and a cross sectional area of the vent passage 20 may be set in certain ranges respectively in order to improve the advantage above. Preferably, the mold body 1M has a plurality of vent passages 20.

Figure 2:
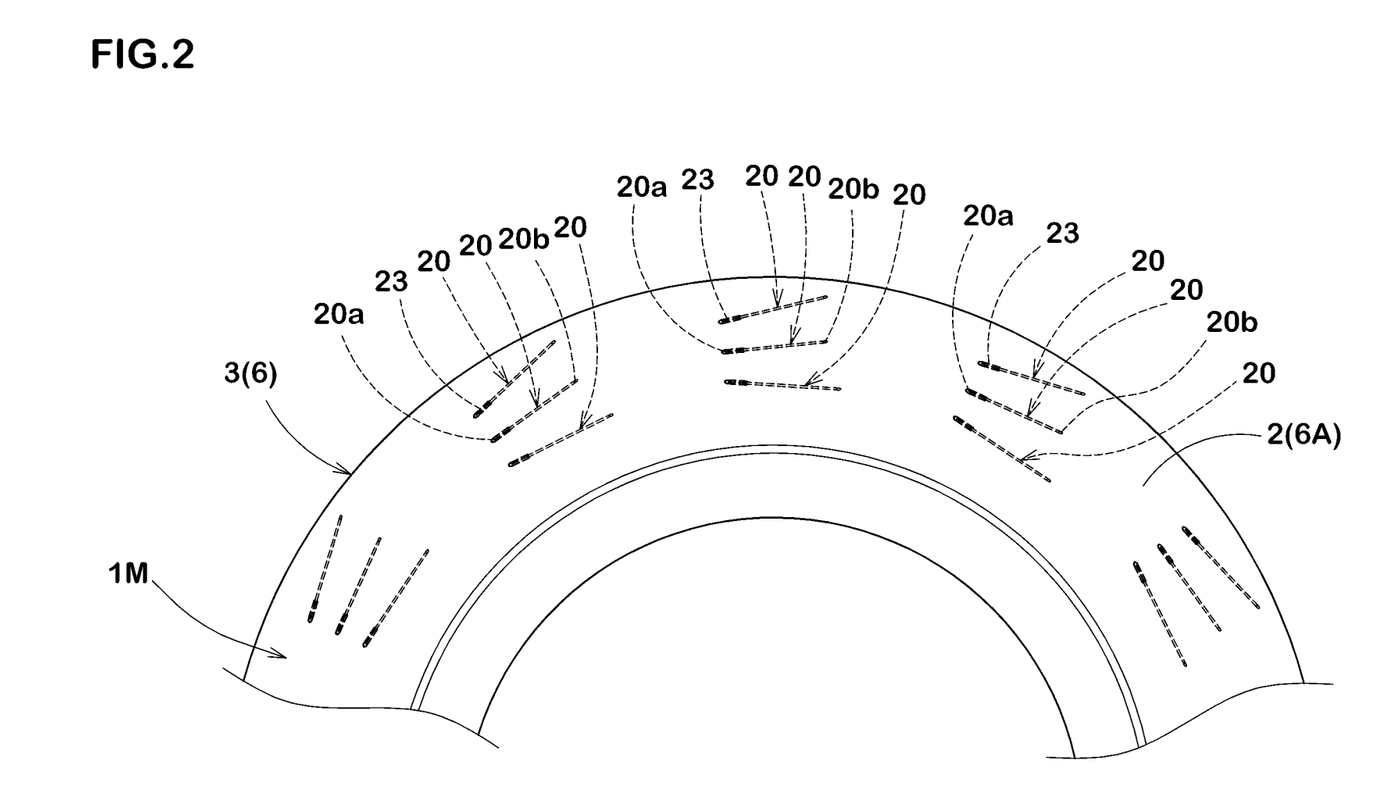
FIG. 2 is a side view of a sidewall mold viewed from an inner surface thereof.
Figure 3:
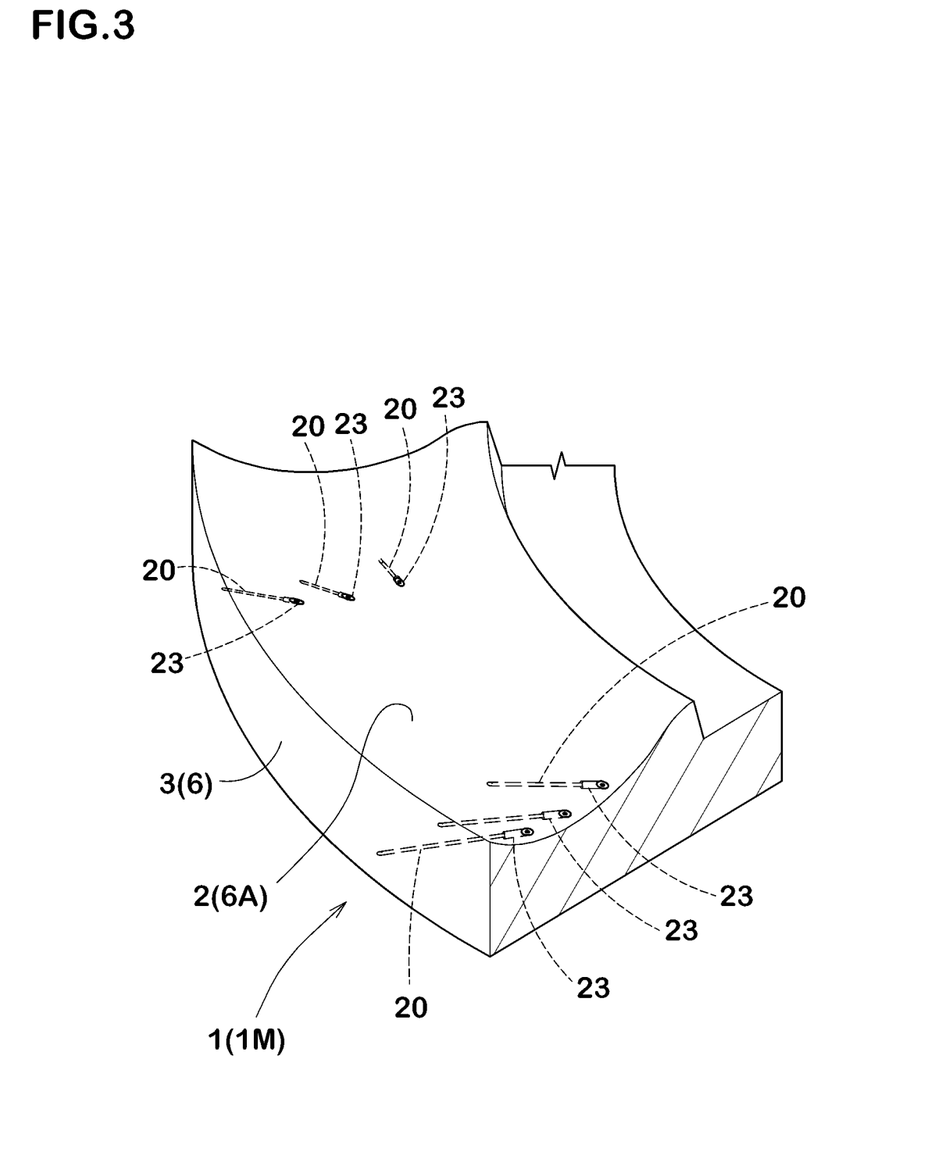
FIG. 3 is a partial enlarged perspective view of the sidewall mold.
Figure 4:
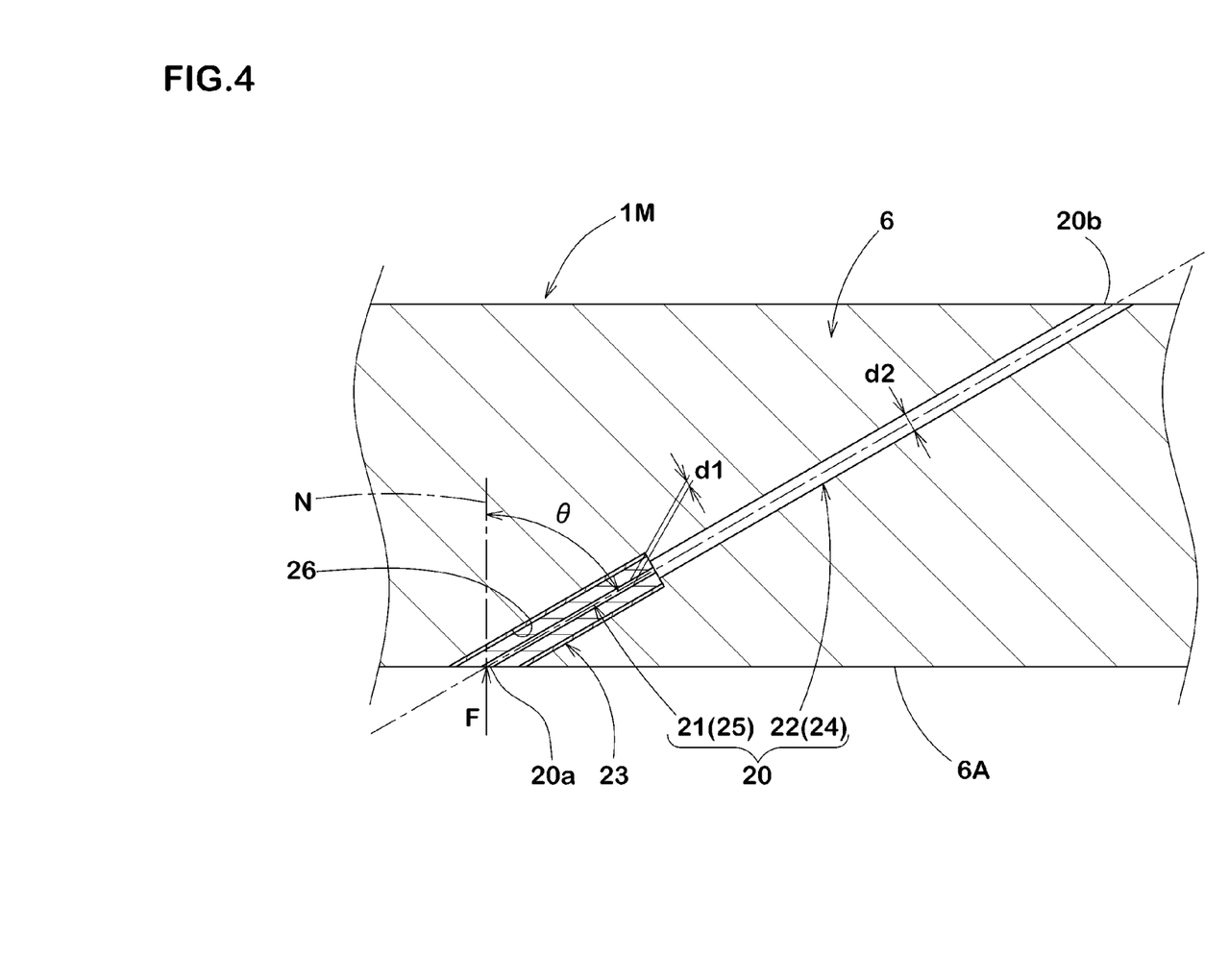
FIG. 4 is a cross sectional view taken along a line A-A of FIG. 1.

FIG. 2 is a side view of the sidewall mold 6 of the mold 1 viewed from the inner surface 6A thereof along an arrow x of FIG. 1. FIG. 3 is a partial enlarged perspective view of the sidewall mold 6. FIG. 4 is a cross sectional view taken along a line A-A of FIG. 1. Referring to FIGS. 2 to 4, the vent passage 20 communicates with the sidewall inner surface 6A of the mold body 1M at an angle θ of not less than 60 degrees, and less than 90 degrees with respect to a normal line N perpendicular to the inner surface 6A at the inlet end 20a.

Thus, during vulcanizing process, plasticized rubber flow along the normal line N to the inner surface 6A due to the bladder receives resistance from the vent passage 20, since the vent passage 20 is inclined at a large angle θ with respect to the normal line N. Namely, a force F toward at the inlet end 20a of the vent passage 20 along the normal line N is divided into a component of the force F sin θ that pushes perpendicular to the surface of the vent passage 20 and a component of the force F cos θ being parallel to the vent passage 20. Since the angle θ above is set in a range of not less than 60 degrees and not more than 90 degrees, the component of the force F cos θ is reduced 50% or less as compared to the force F. Thus, the mold 1 in accordance with the present invention reduces amount of rubber insertion in the vent passage 20 so that the tire has no or very few spews. Additionally, the mold 1 may reduce troubles due to a clogged vent passage 20 with a scorched rubber.

The vent passage 20 in this embodiment extends so as to straightly connect between the inner surface 6A and the exterior of the mold. This helps to improve productivity of the mold 1. The vent passage 20, however, may include a curved portion at least partially.

The vent passage 20 may have any inclination direction with respect to the inner surface 6A of the mold. Referring to FIGS. 2 to 3, the vent passage 20 in this embodiment inclines at the angle θ to a circumferential direction of the tire. This helps to easily arrange a plurality of vent passages 20 in the radial direction of the tire with small space. In another aspect of the invention, the vent passage 20 may incline to the radial direction of the tire.

For example, a method for machining using a drill is suitable to form the vent passage 20 in the molds 5, 6, 7. The most simply vent passage is a passage that is just finished up by the machining above.

In another aspect of the invention, in order to form the vent passage 20 in the mold, a vent pipe 23 with a through hole may be attached in the mold. This helps to provide a vent passage having a small cross sectional area.

Figure 5:
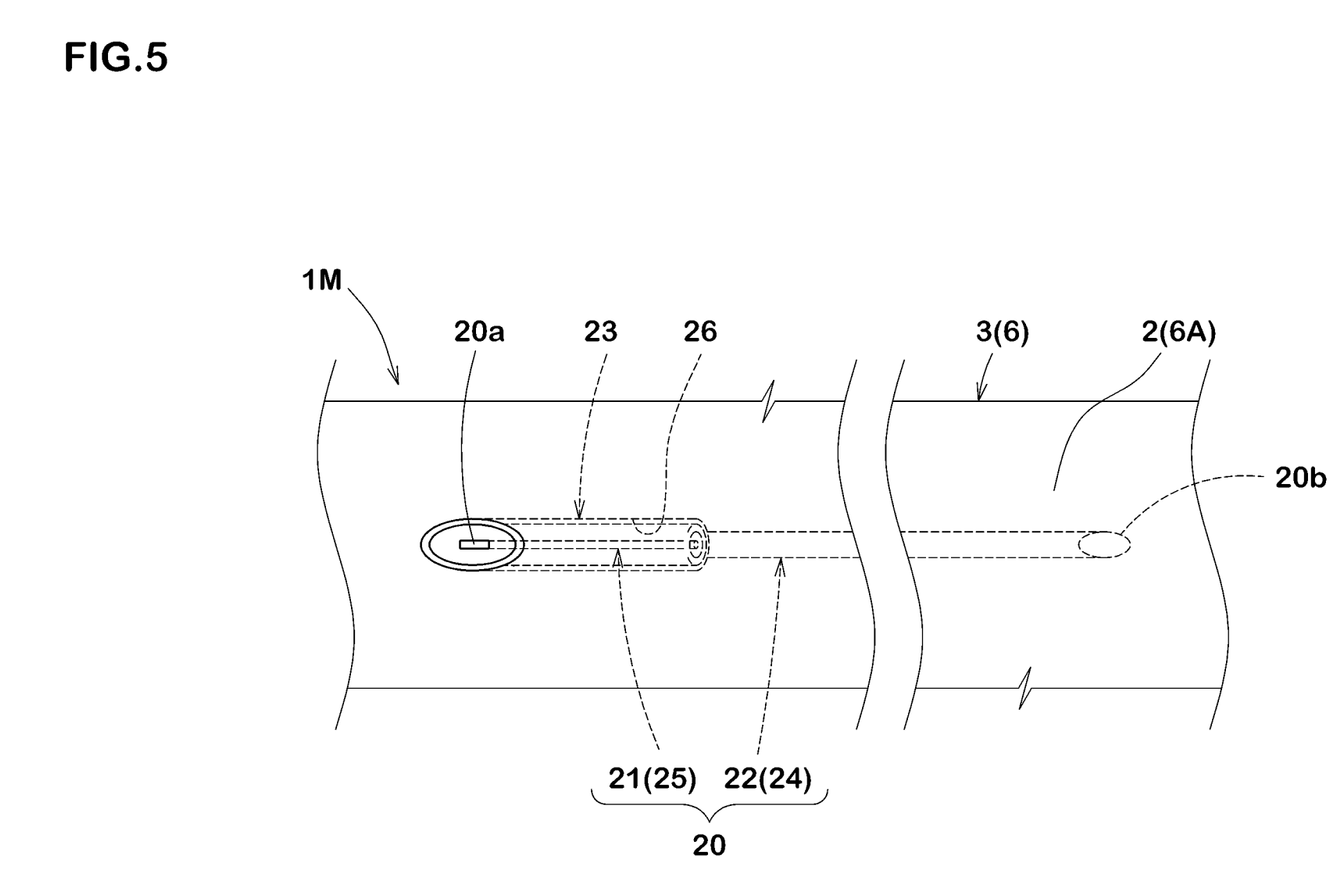
FIG. 5 is a view from x of FIG. 1.

FIG. 5 is an enlarged view from x of FIG. 1. Referring to FIGS. 4 to 5, the vent passage 20 in this embodiment comprises a first portion 21 that extends from the inner surface 6A of the mold body 1M and a second portion 22 that extends from the first portion 21 toward the exterior of the mold body 1M.

The second portion 22 is a passage 24 which is just finished up in the mold body 1M by the machining above.

The first portion 21 is a through hole 25 of the vent pipe 23 that has a short length and is detachably inserted in the hole 26 provided on the inner surface 6A of the mold body 1M. The through hole 25 having an internal diameter d1 communicates with the passage 24 of the second portion 22. The hole 26 has an internal diameter larger than that of the passage 24.

Figure 6:
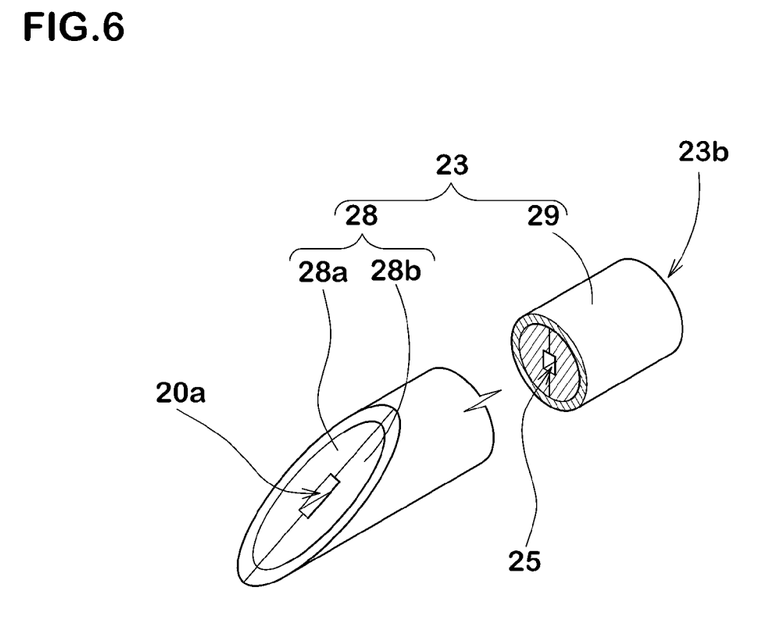
FIG. 6 is a perceptive view of a vent pipe of the tire vulcanization mold.

Referring to FIG. 6, the vent pipe 23 comprises an outer pipe 29 and an inner pipe 28 having the through hole 25 that is completed by two pieces 28a, 28b firmly inserted in the outer pipe 29. Since such a vent pipe 23 is able to be formed using machining working, it may easily produce a passage having small cross sectional area. The vent pipe 23 also helps to adjust the cross sectional area at the inlet end 20a of the passage.

In order to effectively escape the gas from the mold 1, the cross sectional area of the vent passage 20 at the inlet end 20a is preferably in a range of not less than 0.10 mm$^2$, more preferably not less than 0.16 mm$^2$. In order to reduce the amount of rubber insertion into the vent passage 20 during vulcanization process, the cross sectional area of the vent passage 20 at the inlet end 20a is preferably in a range of not more than 0.30 mm$^2$, more preferably not more than 0.24 mm$^2$.

Referring to FIG. 5, the through hole 25 of the vent pipe 23 preferably has a cross section having a rectangular shape at the inner surface 6A. Referring to FIG. 6, such a rectangular shape is such that a passage having a square cross section is diagonally cut along the inner surface 6A. In this embodiment, the vent pipe 23 has a circumferentially long rectangular shape at the inner surface 6A.

Figure 7:
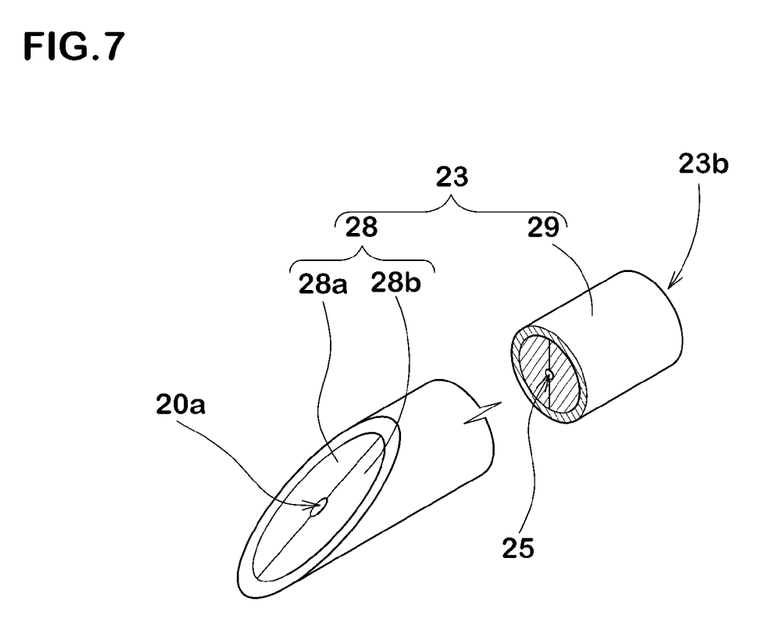
FIG. 7 is a perceptive view of another aspect of the vent pipe.
Figure 8A:
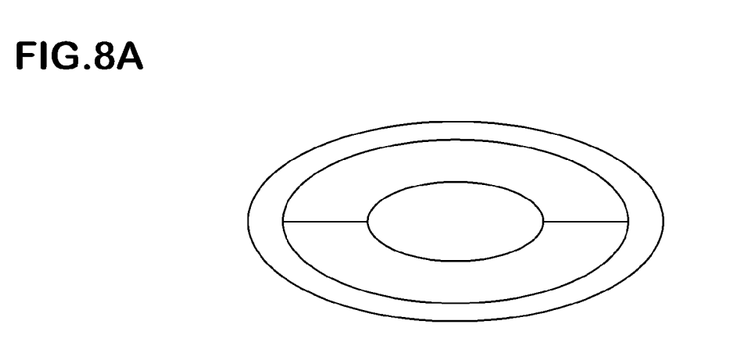
FIGS. 8A to 8E are front views of example vent pipes viewed from the inner surface of the tire vulcanization mold.
Figure 8B:
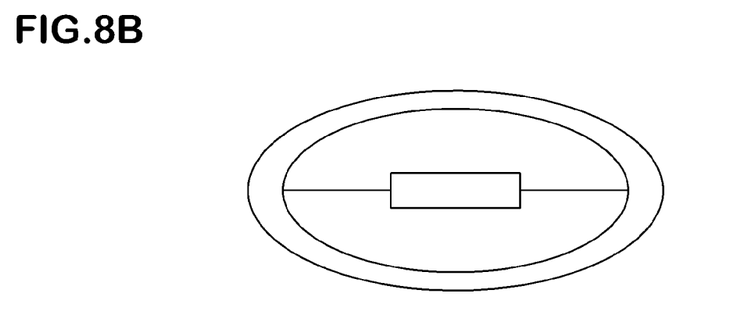
Figure 8C:
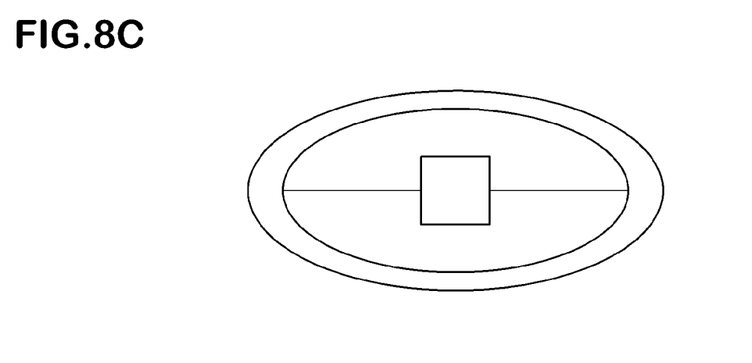
Figure 8D:
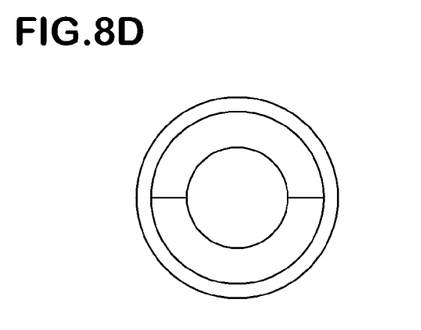
Figure 8E:
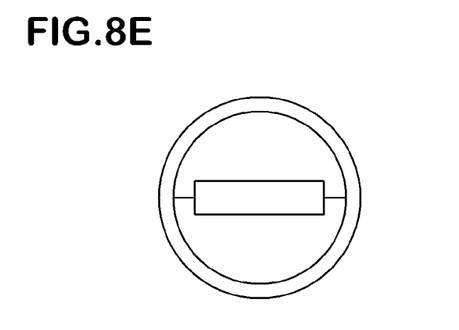

In another aspect of the invention, referring to FIG. 7, the through hole 25 of the vent pipe 23 may have a cross section having an elliptic shape at the inner surface 6A. Such an elliptic shape is such that a passage having a circular cross section is diagonally cut along the inner surface 6A.

The vent passage 20 may be provided not only the sidewall mold 8 but also the tread mold 5. Especially, the vent passage 20 is provided at a tread shoulder portion of the tread mold 5.

The tire vulcanization mold 1 is usable for any kinds of tires such as a motorcycle tire, a passenger car tire, a heavy-duty tire, a racing cart tire and a high-speed and heavy-duty tire for airplanes.

As in the foregoing, a preferred embodiment of the present invention is described above. However, the present invention is not limited to the illustrated embodiment, and can be modified and carried out in various manners.

Comparative Test:

In order to confirm the advantage of the present invention, pneumatic tires with sizes of 215/45R17 were vulcanized by using tire vulcanization molds having the details shown in Table 1. Each green tire was pressed with 220 kPa onto the inner surface of the mold with 180 degrees Celsius and vulcanized at 190 degree celsius. After vulcanizing 1,000 tires, the amount of rubber insertion in vent passages and the number of clogged vent passages due to rubber compound scorch in each mold were evaluated by score in maximum 10. Additionally, the number of molding defectives of the tire vulcanized in each mold was evaluated by a score in maximum 10.

Each tire vulcanization mold used in the vulcanized process has the same specification such as the number of vent passages and the arrangement thereof except for the details shown in Table 1. The cross sectional shape of vent passages at the inner surface of each mold was shown in Table 1 and FIGS. 8A to 8E.

The Table 1 shows the test results at the first time, the $300^{th}$ time, the $600^{th}$ time and the $1000^{th}$ times, respectively, wherein the larger the score, the better the performance is. Test methods are as follows.

The Amount of Rubber Insertion in Vent Passages Test:

In the event that rubber comes into a vent passage of a tire vulcanization mold during vulcanized process, it is vulcanized and remains as a spew on an outer surface of the vulcanized tire. Thus, the amount of rubber in vent passages was evaluated by measuring the height of the spew formed on each vulcanized tire surface. The main valuation basis is as follows.

10: No spew is formed.
5: spew with a height of not more than 2.5 mm is formed.
1: spew with a height of not less than 5 mm is formed.

Clogged Vent Passages Due to Rubber Compound Scorch Test:

After vulcanized process, the number of clogged vent passages due to rubber compound scorch were measured and evaluated in each tire vulcanization mold. The main valuation basis is as follows.

10: NO vent passage is clogged.
5: A half of vent passages are clogged with rubber compound scorch.
1: All vent passages are clogged with rubber compound scorch.

Molding Defective Test:

The molding defectives were measured on twenty (20) tires vulcanized around in each of the first time, the 300th time, the 600th time and the 1000th times, respectively. As the first time test, the first 20 tires were used.

The main valuation basis is as follows.

10: NO molding defective is measured.
5: 10 tires have molding defectives.
1: 20 tires have molding defectives.

The results of the Tests are shown in Table 1.

TABLE 1

|  | Ref. 1 | Ref. 2 | Ref. 3 | Ex. 1 | Ex. 2 | Ex. 3 | Ex. 4 | Ex. 5 | Ex. 6 |
|---|---|---|---|---|---|---|---|---|---|
| Vent passage angle θ (deg.) | 0 | 0 | 55 | 60 | 80 | 80 | 80 | 80 | 80 |
| Vent passage inlet end shape (FIG.) | 8D | 8E | 8B | 8B | 9A | 8B | 8C | 8B | 8B |
| Circumferential length of inlet end of vent passage (mm) | 0.45 | 0.63 | 0.63 | 0.63 | 0.45 | 0.63 | 0.4 | 0.5 | 0.8 |
| Radial length of inlet end of vent passage (mm) | 0.45 | 0.25 | 0.25 | 0.25 | 0.45 | 0.25 | 0.4 | 0.2 | 0.3 |
| Inlet end cross sectional area (mm$^2$) | 0.16 | 0.16 | 0.16 | 0.16 | 0.16 | 0.16 | 0.16 | 0.1 | 0.24 |
| The first time (Score) Amount of rubber in vent passage test | 1 | 1 | 6 | 9 | 9 | 10 | 8 | 10 | 6 |
| Clogged vent passage test | 10 | 10 | 10 | 10 | 10 | 10 | 10 | 10 | 10 |
| Molding defectives test | 10 | 10 | 10 | 10 | 10 | 10 | 10 | 9 | 10 |
| The $300^{th}$ time (Score) Amount of rubber in vent passage test | 1 | 1 | 6 | 9 | 9 | 10 | 8 | 9.5 | 6 |
| Clogged vent passage test | 8 | 7 | 8.5 | 9 | 9.5 | 10 | 9 | 8.5 | 8.5 |
| Molding defectives test | 9 | 8 | 10 | 9.5 | 10 | 10 | 9.5 | 9 | 9 |
| The $600^{th}$ time (Score) Amount of rubber in vent passage test | 1 | 1 | 6 | 8.5 | 9 | 10 | 8 | 9.5 | 5.5 |
| Clogged vent passage test | 6 | 5 | 6.5 | 8 | 9 | 9.5 | 8 | 7 | 8.5 |
| Molding defectives test | 7 | 6 | 7.5 | 8.5 | 9.5 | 10 | 8.5 | 7.5 | 9 |
| The $1000^{th}$ time (Score) Amount of rubber in vent passage test | 1 | 1 | 6 | 8.5 | 9 | 10 | 8 | 9 | 5 |
| Clogged vent passage test | 4 | 3 | 4.5 | 7.5 | 8 | 9 | 7 | 6 | 7 |
| Molding defectives test | 5 | 4 | 5.5 | 8 | 8.5 | 9.5 | 7.5 | 6.5 | 7.5 |

As the result of the test shown in Table 1, it has been confirmed that example tires according to the present invention have less spews and molding defectives.

The invention claimed is:

1. A tire vulcanization mold comprising:
    a mold body having an inner surface for molding a tire outer surface and
    at least one vent passage for the escape of gas in the mold during vulcanization, the vent passage having an inlet end and an outlet end, the inlet end being opened on the inner surface of the mold body, the outlet end communicating with an exterior of the mold body, and the vent passage being inclined to a circumferential direction of the tire, wherein
    the vent passage communicates with the inner surface of the mold body at an angle of not less than 60 degrees, and less than 90 degrees with respect to a normal line perpendicular to the inner surface at the inlet end.

2. The mold according to claim 1, wherein
    the inner surface includes a sidewall inner surface for molding a sidewall of the tire, and the inlet end of the vent passage is opened on the sidewall inner surface of the mold body.

3. The mold according to claim 1, wherein
the vent passage comprises a first portion and a second portion,
the first portion extends from the inlet end,
the second portion extends from the first portion toward the exterior of the mold, and
the first portion is a through hole of a vent pipe which is detachably inserted in a hole provided on the inner surface of the mold body.

4. The mold according to claim 3, wherein the through hole of the vent pipe has a cross sectional area in a range of from 0.10 to 0.30 mm$^2$.

5. The mold according to claim 1, wherein the inlet end of the vent passage has a circumferentially long oblong shape.

6. The mold according to claim 5, wherein the oblong shape is a rectangular shape.

* * * * *